United States Patent
Chun et al.

(10) Patent No.: US 8,953,512 B2
(45) Date of Patent: Feb. 10, 2015

(54) MULTI-CARRIER TRANSMITTING APPARATUS AND METHOD FOR MULTICAST SERVICE

(75) Inventors: Sun-Sim Chun, Daejeon-si (KR); Young-Il Kim, Daejeon-si (KR); Han-Nah Kim, Gyeongsangbuk-do (KR); Dae-Geun Park, Daejeon-si (KR); Won Ryu, Daejeon-si (KR)

(73) Assignee: Electronics and Telecommunications Research Institute, Daejeon-si (KR)

(*) Notice: Subject to any disclaimer, the term of this patent is extended or adjusted under 35 U.S.C. 154(b) by 149 days.

(21) Appl. No.: 13/604,826

(22) Filed: Sep. 6, 2012

(65) Prior Publication Data

US 2013/0286923 A1 Oct. 31, 2013

(30) Foreign Application Priority Data

Apr. 25, 2012 (KR) .................. 10-2012-0043446

(51) Int. Cl.
 *H04H 20/71* (2008.01)
 *H04L 12/28* (2006.01)
 *H04L 12/56* (2006.01)

(52) U.S. Cl.
 USPC .......................... 370/312; 370/390

(58) Field of Classification Search
 CPC .. H04W 72/005; H04W 12/189; H04L 45/16; H04L 12/185
 USPC .......................... 370/312, 389, 390
 See application file for complete search history.

(56) References Cited

U.S. PATENT DOCUMENTS

| | | | |
|---|---|---|---|
| 2003/0128658 A1* | 7/2003 | Walton et al. | 370/208 |
| 2004/0014482 A1 | 1/2004 | Kwak et al. | |
| 2007/0165566 A1* | 7/2007 | Khan et al. | 370/329 |
| 2008/0182580 A1* | 7/2008 | Laroia et al. | 455/440 |
| 2009/0247092 A1* | 10/2009 | Beaudin et al. | 455/73 |
| 2009/0323577 A1* | 12/2009 | Agrawal et al. | 370/312 |
| 2011/0194419 A1 | 8/2011 | Lee et al. | |
| 2012/0051294 A1* | 3/2012 | Guillouard | 370/329 |
| 2013/0028304 A1* | 1/2013 | Murata | 375/219 |

FOREIGN PATENT DOCUMENTS

| | | |
|---|---|---|
| KR | 10-0713435 B1 | 5/2007 |
| KR | 1020110098339 A | 9/2011 |

OTHER PUBLICATIONS

Shun-Shim Chun, et al; "The Management Method of Multi-carrier for Multicast Services", 2012 14th International Conference on Advanced Communication Technology, Feb. 19-22, 2012; pp. 383-386.

* cited by examiner

Primary Examiner — Ronald Abelson
(74) Attorney, Agent, or Firm — Ladas & Parry LLP

(57) ABSTRACT

Provided are an apparatus and method for transmitting multi-carriers to provide a high-quality service to multicast-based service subscriber terminals. The method includes: mapping first data for providing the multicast service, and second data different from the first data, to different antennas; converting the first mapped data into a first Intermediate Frequency (IF) signal and the second mapped data into a second IF signal; converting the first IF signal into a first RF signal having a carrier frequency, and deciding a power intensity of the first RF signal so that the first RF signal is transmitted over the entire coverage region of the base station; and converting the second IF signal into a second RF signal having the other carrier frequency, and deciding a power intensity of the second RF signal so that the second RF signal is transmitted over a predetermined region around the base station.

18 Claims, 9 Drawing Sheets

MULTI-CARRIER TRANSMITTING APPARATUS AND METHOD FOR MULTICAST SERVICE

CROSS-REFERENCE TO RELATED APPLICATION

This application claims the benefit under 35 U.S.C. §119(a) of Korean Patent Application No. 10-2012-0043446, filed on Apr. 25, 2012, the entire disclosure of which is incorporated herein by reference for all purposes.

BACKGROUND

1. Field

The following description relates to multicast service technology, and more particularly, to an apparatus and method for transmitting multi-carriers to provide a high-quality service to service subscriber terminals.

2. Description of the Related Art

A Multicast Broadcast Service (MBS) zone is composed of several base stations, wherein all the base stations transmit multicast data simultaneously using the same radio resources in time and frequency domains. Accordingly, terminals located near the borders of neighboring cells can obtain macro diversity gain for MBS.

A multicast service enables terminals to receive the same service through the same radio resources. However, since terminals have different wireless channel conditions, a scheduler of each base station has to perform scheduling suitable for a terminal having the worst channel condition among all terminals that requested to receive the multicast service, in order to provide the multicast service to all the terminals. That is, the multicast service could not distinguish terminals having good channel conditions from ones having poor channel conditions.

Also, there is a service based on scheduling of setting a threshold channel condition, classifying terminals that requested to receive a multicast service into two or more groups according to the threshold channel condition, and allocating different radio resources to the groups, respectively.

However, both the methods described above caused a waste of resources. That is, since the former performs scheduling based on a terminal having the worst channel condition, a low code rate has to be applied to terminals having good channel conditions, and signals from the terminals having good channel conditions also have to be transmitted with a high power intensity. Meanwhile, since the latter overlappingly allocates radio resources to different groups, a waste of radio resources is caused.

Multi-carrier resource allocation technology using two or more radio frequencies (RF) can allocate a plurality of radio frequencies to each terminal. However, if carriers are equally allocated to all terminals that use a multicast service, regardless of their channel conditions, the multicast service cannot provide the effect of throughput improvement which is the use purpose of multi-carrier.

SUMMARY

The following description relates to a method for multi-carrier operation, capable of providing a high-quality multicast service to terminals that use the multicast service, according to their channel conditions, without overlappingly allocating radio resources to the terminals.

In one general aspect, there is provided a multi-carrier transmitting apparatus for providing a multicast service in a base station using a multi-input and multi-output (MIMO) scheme, including: a mapping unit configured to map first data for providing the multicast service, and second data different from the first data, to first and second antennas, respectively; a Radio Frequency (RF) processor configured to convert the first data mapped to the first antenna into a first transmission-band RF signal of a carrier corresponding to the first data, and the second data mapped to the second antennas into a second transmission-band RF signal of a carrier corresponding to the second data, respectively; and an antenna mapping unit configured to transmit the first transmission-band RF signal through the first antenna, and the second transmission-band RF signal through the second antenna, respectively.

In another general aspect, there is provided a multi-carrier transmitting apparatus for providing a multicast service in a base station using a multi-input and multi-output (MIMO) scheme, including: a MIMO encoding unit configured to multiply first data for providing the multicast service, and second data different from the first data by first and second weights according to a MIMO scheme, respectively, thereby encoding the first data and the second data to first encoded data and second encoded data, respectively; a mapping unit configured to logically map the first encoded data and the second encoded data to first and second antennas that are to transmit the first encoded data and the second encoded data, respectively, thereby generating a first mapped signal and a second mapped signal; an Radio Frequency (RF) processing unit configured to convert the first mapped signal into a first transmission-band RF signal of a carrier corresponding to the first mapped signal, and the second mapped signal into a second transmission-band RF signal of a carrier corresponding to the second mapped signal, respectively; and an antenna unit configured to transmit the first transmission-band RF signal through the first antenna and the second transmission-band RF signal through the second antenna.

In another general aspect, there is provided a method for transmitting multi-carriers to provide a multicast service in a base station using a multi-input and multi-output (MIMO) scheme, including: mapping first data for providing the multicast service, and second data different from the first data, to different antennas, respectively, thereby generating first mapped data and second mapped data; converting the first mapped data into a first Intermediate Frequency (IF) signal and the second mapped data into a second IF signal, respectively; converting the first IF signal into a first RF signal having a carrier frequency among two carrier frequencies adjacent to each other, and deciding a power intensity of the first RF signal so that the first RF signal is transmitted over the entire coverage region of the base station; and converting the second IF signal into a second RF signal having the other carrier frequency among the carrier frequencies adjacent to each other, and deciding a power intensity of the second RF signal so that the second RF signal is transmitted over a predetermined region around the base station, wherein the power intensity of the second RF signal is set to be lower than a predetermined threshold intensity.

In another general aspect, there is provided a method for transmitting multi-carriers to provide a multicast service in a base station using a multi-input and multi-output (MIMO) scheme, including: multiplying first data for providing the multicast service, and second data different from the first data by first and second weights according to the MIMO scheme, respectively, thereby encoding the first data and the second data to first encoded data and second encoded data, respectively; logically mapping the first encoded data and the second encoded data to first and second antennas that are to transmit the first encoded data and the second encoded data, respectively, thereby generating a first mapped signal and a second mapped signal; converting the first mapped signal into a first transmission-band RF signal of a carrier corresponding to the first mapped signal, and the second mapped signal into a second transmission-band RF signal of a carrier corresponding to the second mapped signal, respectively; and transmitting the first transmission-band RF signal through the first antenna and the second transmission-band RF signal through the second antenna.

Other features and aspects will be apparent from the following detailed description, the drawings, and the claims.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Figure 1:
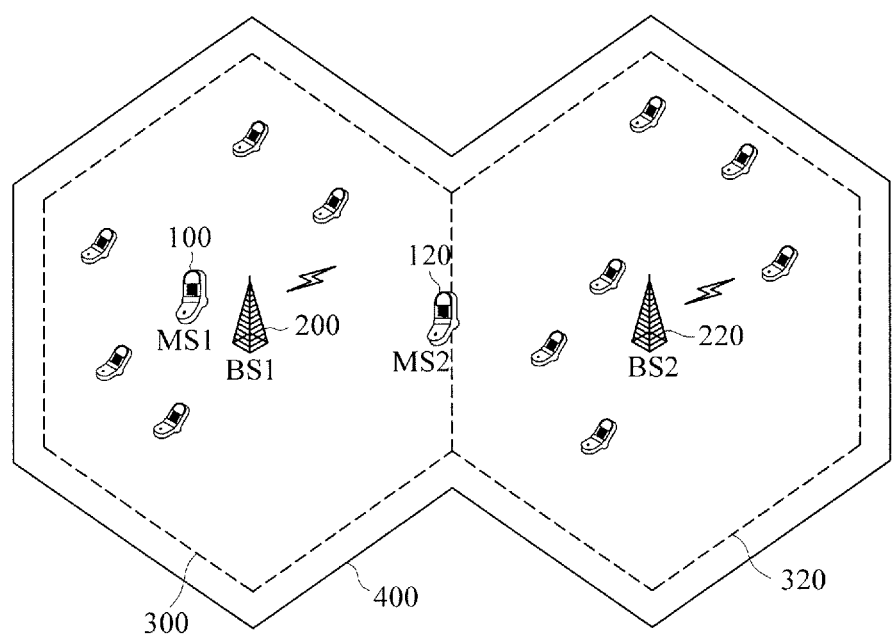
FIG. 1 shows the case where terminals receiving multicast service data are distributed into different cells.

FIG. 1 shows the case where terminals receiving multicast service data are distributed into different cells 300 and 320.

FIG. 1 corresponds to the case where terminals receiving a specific multicast service are dispersively distributed into the cells 300 and 320 that are service regions of different base stations (that is, first and second base stations BS1 and BS2) 200 and 220.

In the case of FIG. 1, the two cells 300 and 320 configure a MBS zone 400, the cell 300 corresponds to a service region of the first base station 200, and the cell 320 corresponds to a service region of the second base station 220. In the cell 300 of the first base station 200, a first terminal (MS1) 100 is located near the first base station 200, and a second terminal (MS2) 120 is located near the border between the cell 300 and the cell 320 of the second base station 220.

If the first and second terminals 100 and 120 use a unicast service, the first and second terminals 100 and 120 perform communication by being allocated modulation and coding scheme (MCS) levels suitable for their channel conditions.

However, if the first and second terminals 100 and 120 use a multicast service, the first and second terminals 100 and 120 have to receive the same data service. Accordingly, in order to transmit the same data to the first and second terminals 100 and 120, the data has to be transmitted according to a MCS level suitable for the radio channel condition of a terminal under a worse radio channel condition. Generally, since the radio channel condition of a terminal deteriorates in proportion to the distance to a base station, the radio channel condition of the second terminal 120 is worse than that of the first terminal 100. As a result, data has to be transmitted to the first terminal 100 according to a low MCS level suitable for the channel condition of the second terminal 120, although the data can be transmitted to the first terminal 100 according to a high MCS level.

In the present invention, a multicast service is provided using multi-carriers so that the first terminal 100 can maintain a dependent relationship with the second terminal 120 while maintaining an independent relationship with the second terminal 120. In other words, there is provided a method capable of providing a differentiated service or an additional service according to the channel conditions of the first and second terminals 100 and 120 while enabling both the first and second terminals 100 and 120 to receive multicast data.

As describe above, due to the characteristics of the multicast service, it is impossible to provide the multicast service to each terminal through the most efficient carrier for the terminal. In the current example, base stations inform all service subscriber terminals of available carriers for the terminals. Details about this will be given with reference to the drawings.

Meanwhile, for convenience of description, the remaining drawings except for FIG. 1 show only two terminals. Also, the MBS zone 400 composed of the service regions of the different base stations 200 and 220 is shown only in FIG. 1 and not shown in the remaining drawings. However, in the remaining drawings, likewise, it is assumed that the service regions of the two base stations 200 and 220 configure a MBS zone. Also, for convenience of description, it is assumed that the base station 200 or 220 of each cell operates two carriers for a multicast service.

Figure 2:
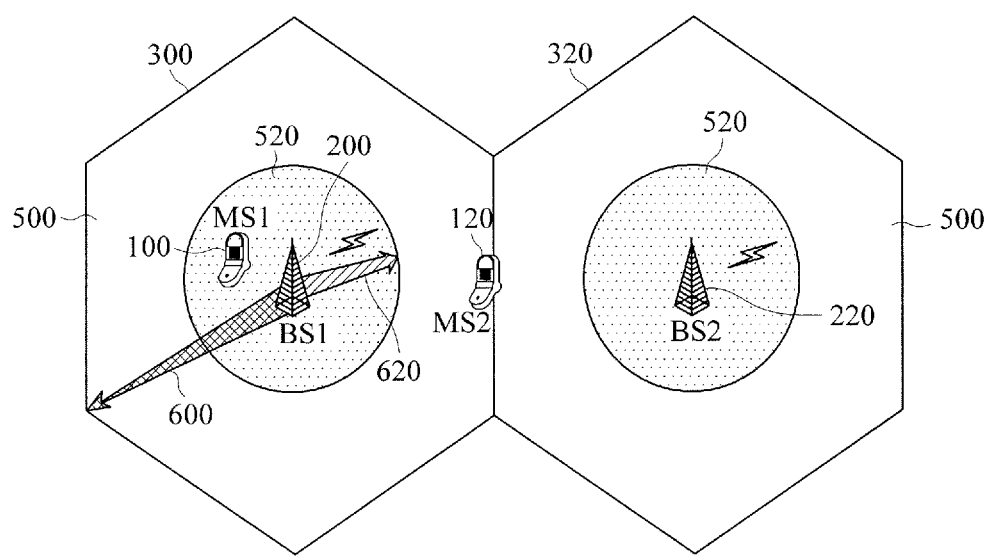
FIG. 2 is a view for explaining an example of separation of data transmission regions in which a multicast service is provided through multi-carriers adjacent to each other.

FIG. 2 is a view for explaining an example of separation of data transmission regions in which a multicast service is provided through multi-carriers 500 and 520 adjacent to each other.

The multi-carriers 500 and 520 adjacent to each other, allocated for the multicast service, are transmitted with different power intensities in the service region of each base station 200 or 220. That is, as shown in FIG. 2, the power intensity of the carrier 520 is set to a low intensity with which the carrier 520 reaches a relatively short distance (corresponding to a region 520), and the power intensity of the other carrier 500 is set to a high intensity with which the carrier 500 can reach the border of the service region of the corresponding base station 200. As such, a multicast service is provided through two carriers in the service region of a base station. Accordingly, the second terminal 120 located near the border of the service region of the base station receives signals through the carrier 500. The second terminal 120 also receives signals from the base station 220 neighboring the base station 200, thereby obtaining macro diversity gain. Meanwhile, the other carrier 520 can provide an additional radio resource to terminals having good channel conditions so as to differentiate quality of service (QoS) of the multicast service according to channel conditions.

When the base station 200 allocates the carriers 500 and 520 (hereinafter, also referred to as A and B carriers, respectively) adjacent to each other to terminals located in the service region of the base station 200, the base station 200 allocates different fixed power intensities to the A and B carriers 500 and 520 so that the A carrier 500 is received by all the terminals (for example, the terminals 100 and 120) located in the service region of the base station 200 and the B carrier 520 is received only by designated some terminals (for example, the terminal 100).

At this time, the base station 200 allocates a higher power intensity to the A carrier 500 than to the B carrier 520 so as to provide the multicast service to all terminals located in the cell 300 or 320. All the base stations 200 and 220 configuring a MBS zone transmit the multicast service through the A carrier 500.

In FIG. 2, the power intensities of the A and B carriers 500 and 520 are represented by the thicknesses of arrows 600 and 620. As illustrated in FIG. 2, the power intensities of the A and B carriers 500 and 520 are reduced from the center of each cell 300 or 320 to the border of the cell 300 or 320. Also, the length of each arrow 600 or 620 represents the coverage of the corresponding carrier 500 or 520. In the example of FIG. 2, for convenience of description, the coverage of the A carrier 500 is set in the shape of a hexagon.

The first and second terminals 100 and 120 receive the multicast service through the A carrier 500, and the second terminal 120 located near the border of the cell 300 receives signals from the first and second base stations 200 and 220 through the A carrier 500. That is, the second terminal 120 located near the border of the cell 300 receives radio data from the plurality of base stations 200 and 220, thereby obtaining macro diversity gain.

The B carrier 520 provides a service only to terminals having a high signal-to-noise ratio (SNR), and is allocated a lower power intensity than the A carrier 500. Accordingly, the power intensity of the B carrier 520 is set to a low intensity at which no macro diversity gain can be acquired due to signal reception from neighboring cells in the same MBS zone.

In FIG. 2, the power intensity of the B carrier 520 is also represented by the thickness of the arrow 620, and the length of the arrow 620 represents the coverage of the B carrier 520. The coverage of the B carrier 520 is set in the shape of a circle whose center is the base station 200. However, it is obvious to one of ordinary skill in the art that the coverage of each carrier is configured in various shapes according to the arrangement of base stations and a peripheral environment. Accordingly, the power intensity of the B carrier 520 has to be decided in consideration to such various conditions.

The base station 200 transmits data that is different from that transmitted through the A carrier 500, through the B carrier 520. Accordingly, some among terminals that use the same multicast service, allocated the B carrier 520, can further receive a higher quality service than the remaining terminals that receive the multicast service only through the A carrier 500.

Meanwhile, the B carrier 520 little affects neighboring cells in the same MBS zone although it transmits data to the neighboring cells, since the power intensity of the B carrier 520 has already been adjusted. Accordingly, it is possible to provide different services according to cells as necessary.

In the example of FIG. 2, the first base station 200 transmits data to the first terminal 100 through the B carrier 520. That is, only the first terminal 100 can use the B carrier 520, and the second terminal 120 cannot use the B carrier 520. Also, the first terminal 100 receives the same multicast service data as that received by the second terminal 120, through the A carrier 500. Further, the first terminal 100 can receive a high quality service, another multicast service, or a unicast service through the B carrier 520. That is, the first terminal 100 may receive, through the B carrier 520 having a high quality, the same multicast service as that transmitted through the A carrier 500, a different multicast service from that transmitted through the A carrier 500, or a unicast service. Also, if the multicast service is a video service, the base station 200 may transmit additional data for providing 3-dimensional (3D) images, through the B carrier 520 having a high quality, and 2-dimensional (2D) images through the A carrier 500 having a low quality. Also, the base station 200 may transmits additional data for 2D images or various kinds of data through the B carrier 520. As such, services that can be transmitted through the B carrier 520 are not limited.

Figure 3:
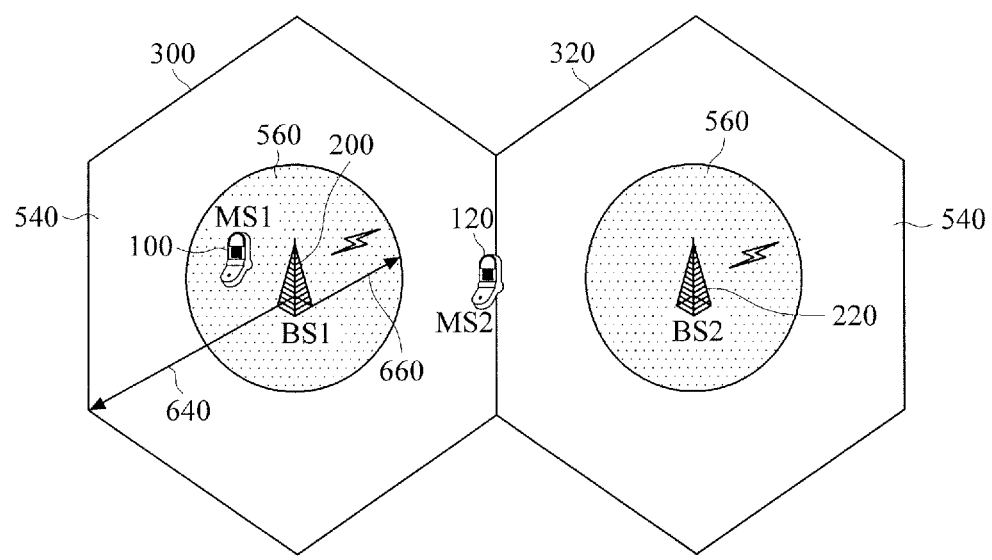
FIG. 3 is a view for explaining another example of separation of data transmission regions in which a multicast service is provided through multi-carriers not adjacent to each other.

FIG. 3 is a view for explaining another example of separation of data transmission regions in which a multicast service is provided through multi-carriers not adjacent to each other.

The example of FIG. 3 is different from the example of FIG. 2 in that multi-carriers not adjacent to each other are used.

That is, one of two carriers not adjacent to each other is transmitted over the entire coverage region of each cell so that terminals located near the border of the cell can obtain macro diversity gain. Also, the other one of the carriers provides an additional radio resource to terminals (that is, terminals having good channel conditions) located near the center of each cell. In this way, it is possible to differentiate the QoS of a multicast service according to channel conditions. The reason of providing the additional radio resource to the terminals located near the center of each cell is because a good channel condition is ensured generally near the center region of each cell rather than the border region of the cell.

For example, it is assumed that the two carriers not adjacent to each other are C and D carriers 540 and 560, having frequencies of 800 MHz and 50 GHz, respectively. When data is transmitted to terminals through the C and D carriers 540 and 560, the C and D carriers 540 and 560 are allocated the same power intensity, so that due to the frequency characteristics of the C and D carriers 540 and 560, the C carrier 540 corresponding to a relatively low frequency can be transmitted to all the terminals, and the D carrier 560 corresponding to a relatively high frequency can be transmitted only to terminals located near the center of each cell.

Accordingly, the C carrier 540 may provide all terminals (in the current example, first and second terminals 100 and 120) in each cell with cell coverage that is wider than that provided by the D carrier 560, and all base stations 200 and 220 configuring a MBS zone transmit a multicast service through the C carrier 540.

As illustrated in FIG. 3, the first and second terminals 100 and 120 simultaneously receive the multicast service through the C carrier 540. At this time, the second terminal 120 located near the border of the cell may receive radio data from the different base stations 200 and 220 through the C carrier 540, thereby obtaining macro diversity gain. In FIG. 3, the cell coverage of the low-frequency C carrier 540 is represented by a long arrow 640, and the length of the arrow 640 corresponds to the coverage of the C carrier 540.

Also, the D carrier 560 provides a predetermined service only to terminals having a high SNR in the cell, and has cell coverage that is narrower than that provided by the C carrier 540. The cell coverage of the D carrier 560 is narrow enough not to provide macro diversity gain to terminals in the neighboring cells belonging to the same MBS zone. Also, each base station in the MBS zone provides data that is different from that provided through the C carrier 540, through the D carrier 560. Accordingly, some among terminals that use the same multicast service, allocated the D carrier 560, can further receive a higher quality service than the remaining terminals that receive the multicast service only through the C carrier 540.

Meanwhile, the D carrier 560 little affects the neighboring cells in the same MBS zone although it transmits data to the neighboring cells. Accordingly, it is possible to provide different services according to cells as necessary. In FIG. 3, the cell coverage of the high-frequency D carrier 560 is represented by a short arrow 660, and the length of the arrow 660 corresponds to the coverage of the D carrier 560.

The first base station 200 allows the first terminal 100 to use the D carrier 560. In the example of FIG. 3, only the first terminal 100 can use the D carrier 560, and the second terminal 120 can acquire no authority to use the D carrier 560. The first terminal 100 may receive the multicast service through the C carrier 540, and simultaneously receive another multicast service or a unicast service through the D carrier 560. That is, the first terminal 100 may receive, through the D carrier 560 having a high quality, the same multicast service as that transmitted through the C carrier 540, a different multicast service from that transmitted through the C carrier 540, or a unicast service.

That is, available multi-carrier bands are classified into multi-carrier bands adjacent to each other and multi-carrier bands not adjacent to each other. The multi-carrier bands adjacent to each other provide two different coverage regions 500 and 520, and the multi-carrier bands not adjacent to each other also provide two different coverage regions 540 and 560.

Hereinafter, how the multi-carriers 500/540 and 520/560 providing different coverage regions are used in multi-input and multi-output (MIMO) antennas will be described.

Figure 4:
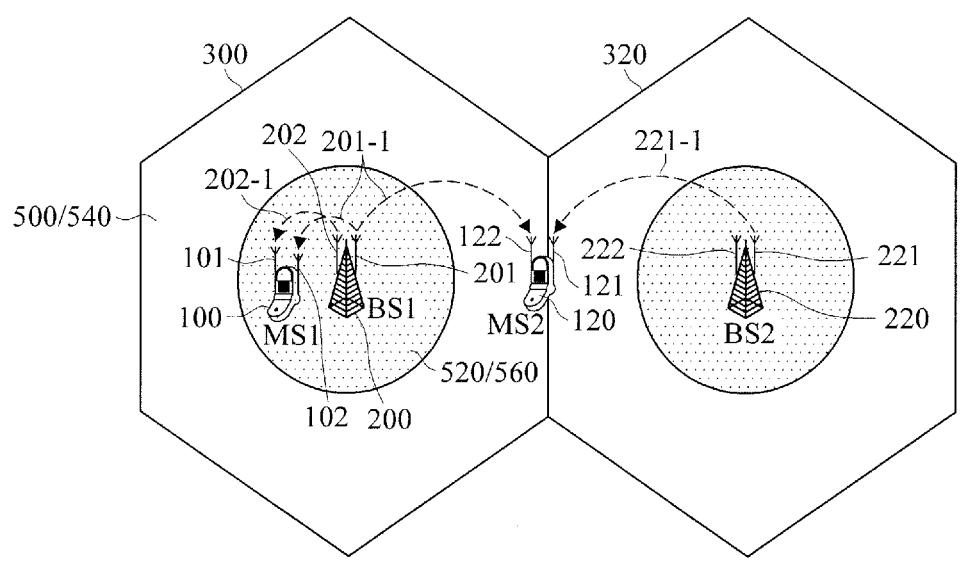
FIG. 4 is a view for explaining an example of a method for multi-carrier operation for providing a multicast service in a multi-input and multi-output (MIMO) system.

FIG. 4 is a view for explaining an example of a method for multi-carrier operation for providing a multicast service in a MIMO system.

In FIG. 4, the method of multi-carrier operation may be applied to the first and second base stations 200 and 220 shown in FIG. 2 or 3. That is, the first base station 200 operates two the multi-carriers 500/540 and 520/560, and 1:1 maps the respective carriers 500/540 and 520/560 to its antennas. Likewise, the second base station 220 operates two the multi-carriers 500/540 and 520/560, and 1:1 maps the respective carriers 500/540 and 520/560 to its antennas. If each of first and second terminals 100 and 120 has two antennas of first and second antennas 101 and 102, the first terminal 100 receives a carrier signal 201-1 that is also received by the second terminal 120, through the first antenna 101, and receives a carrier signal 202-1 that is received only near the center of the corresponding base station 200, through the second antenna 102. That is, the first terminal 100 receives different carrier signals through the respective antennas 101 and 102.

Meanwhile, the second terminal 120 located near the border of the corresponding cell receives the carrier signal 201-1 transmitted from the base station 100, through the second antenna 122, and receives a carrier signal 222-1 transmitted from the second base station 120, through the other antenna 121. As such, the second terminal 120 acquires macro diversity gain using the same signal received from the different base stations 100 and 120. Therefore, by applying the characteristics of the multicast service, it is possible to achieve both macro diversity gain and spatial multiplexing according to the channel conditions of terminals.

Figure 5:
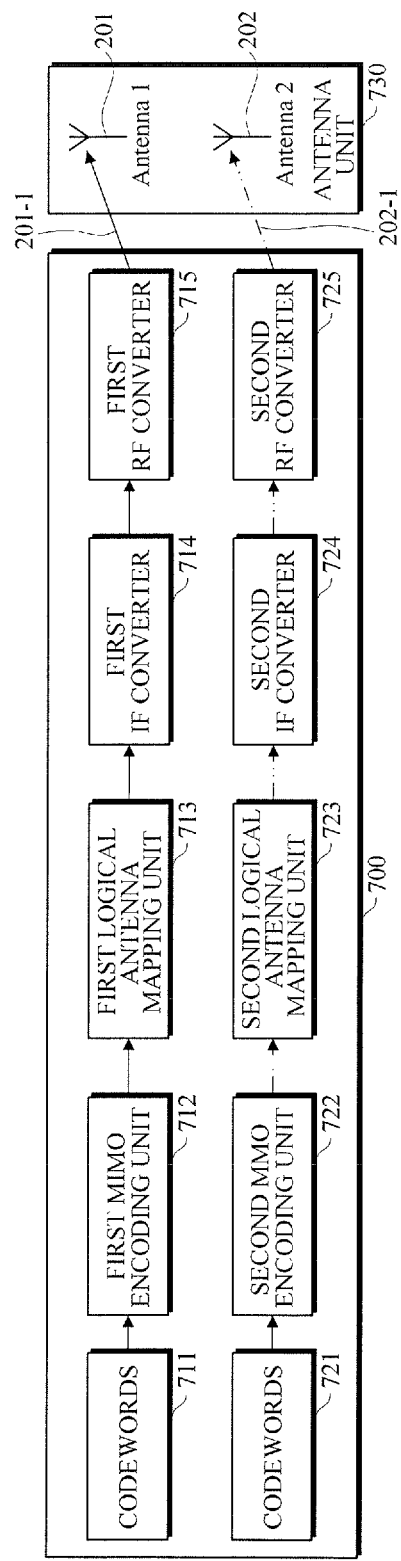
FIG. 5 is a diagram illustrating an example of a multi-carrier transmitting apparatus for providing a multicast service in a MIMO system.

FIG. 5 is a diagram illustrating an example of a multi-carrier transmitting apparatus for providing a multicast service in a MIMO system.

In the example of FIG. 5, data that is to be transmitted is assumed to be data subject to channel coding and modulation. Codewords 711 and 721 that are to be transmitted may be a bundle of data. The codewords 711 and 721 are MIMO-encoded by first and second MIMO encoding units 712 and 722.

MIMO encoding means multiplying data by weighting vectors according to a MIMO scheme. However, in the example of FIG. 5, since data is transmitted through different antennas according to carriers, the processing of the first and second MIMO encoding units 712 and 722 can be omitted. That is, the first and second MIMO encoding units 712 and 722 may be bypassed or omitted.

Then, the codewords 711 and 721 that have been encoded by the first and second MIMO encoding units 712 and 722 or that will be transmitted are collected by first and second logical antenna mapping units 713 and 723 corresponding to the respective antennas 201 and 202. After data that is to be transmitted is collected by the first and second logical antenna mapping units 713 and 723, the data is converted into intermediate frequency (IF) signals by first and second IF converters 714 and 724. Then, the respective IF signals are converted into RF signals corresponding to transmission frequency bands by first and second RF converters 715 and 725, and then the resultant signals are transmitted through the corresponding antennas 201 and 202 of an antenna system 730. At this time, the RF converters 715 and 725 may differentiate the intensities of the signals that are to be transmitted, or set different carrier frequencies according to regions.

Also, the first IF converter 714 and the first RF converter 715 may be integrated into a first RF processing unit, and the second IF converter 724 and the second RF converter 725 may be integrated into a second RF processing unit, or all the IF and RF converters 714, 724, 715, and 725 may be integrated into an RF processing unit.

Figure 6:
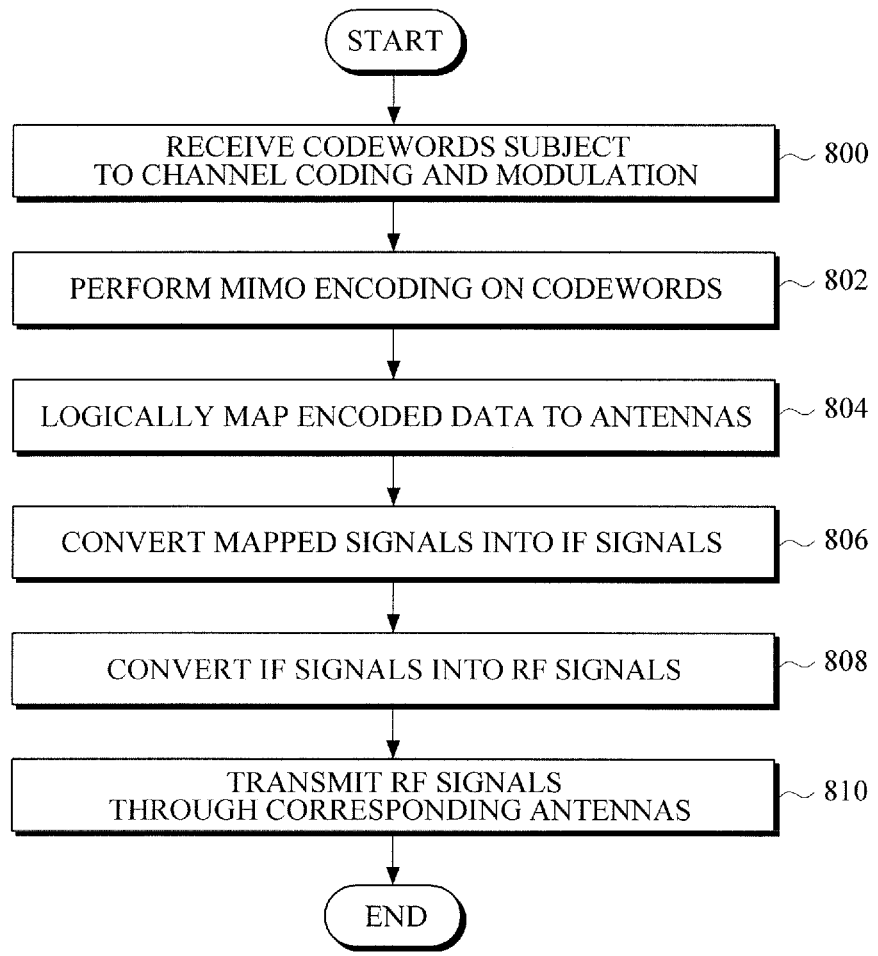
FIG. 6 is a flowchart illustrating an example of a multi-carrier transmitting method for providing a multicast service in a MIMO system.

FIG. 6 is a flowchart illustrating an example of a multi-carrier transmitting method for providing a multicast service in a MIMO system.

In operation 800, a transmitting apparatus receives data subject to channel coding and modulation from the upper layer. The data is codewords (711 and 721 of FIG. 5) that will be transmitted.

Then, in operation 802, the transmitting apparatus performs MIMO encoding on the codewords. MIMO encoding means multiplying the codewords by weighting vectors according to the MIMO scheme. However, since the example of FIG. 5 corresponds to the case where data is transmitted through different antennas according to carriers, the MIMO-encoding may be omitted. That is, the operation 801 may be omitted.

Next, in operation 804, the transmitting apparatus receives the codewords and performs logical antenna mapping on the codewords to collect data that will be transmitted through each antenna. Then, in operation 806, the transmitting apparatus converts data that will be transmitted through each antenna into an IF signal, and in operation 808, the transmitting apparatus converts the IF signal into an RF signal. Next, in operation 810, the resultant RF signals are transmitted over the corresponding regions through the respective antennas 201 and 202.

At this time, signals that are transmitted through each antenna may be transmitted through different carriers adjacent to each other or not adjacent to each other. Also, in the case of providing a multicast service, data that is transmitted through each antenna may be multicast service data, other service data, or unicast service data.

The above-described example relates to the case where carriers are mapped to different antennas. Hereinafter, an example where all carriers share antennas will be described.

First, a method for transmitting multi-carriers through shared antennas in a MIMO system is described below.

If the MIMO scheme is applied to A/C and B/D carrier (500/540 and 520/560 of FIG. 7) and the carriers A/C and B/D share antennas, the carriers A/C and B/D may obtain both macro diversity gain and spatial multiplexing (also, referred to as "SM"), although the complexity of the antennas increases.

Figure 7:
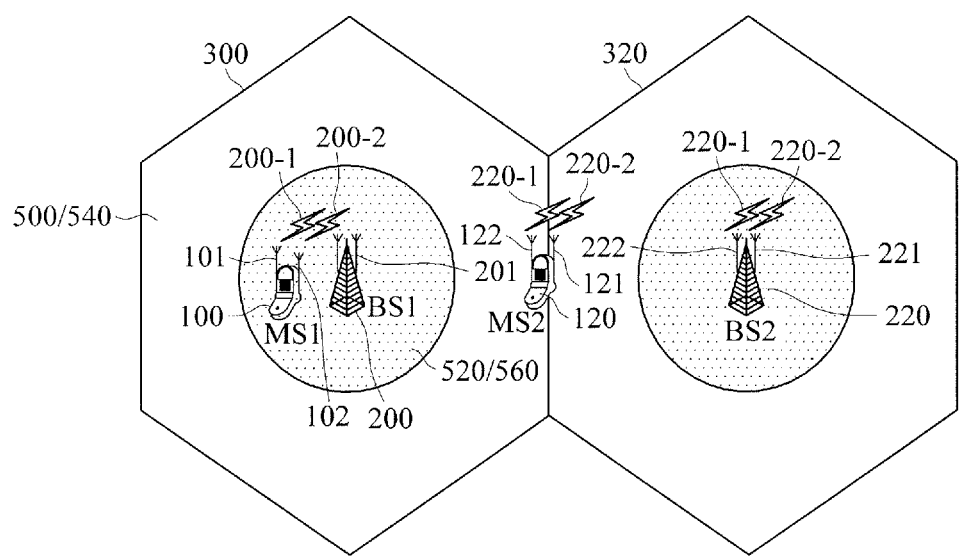
FIG. 7 is a view for explaining another example of a method for multi-carrier operation for providing a multicast service in a MIMO system.

FIG. 7 is a view for explaining another example of a method for multi-carrier operation for providing a multicast service in a MIMO system.

Referring to FIG. 7, base stations 100 and 120 apply a Space-Frequency Block Coding (SFBC) MIMO scheme to the A/C carrier 500/540 so that the A/C carrier 500/540 can obtain MIMO diversity gain.

Since the A/C carrier 500/540 has to provide a multicast service to all terminals belonging to a MBS zone, the SFBC MIMO schedule is applied to the A/C carrier 500/540. However, it is also possible to apply another open-type MIMO scheme for a multicast service to the carrier A/C 500/540. However, for convenience of description, it is assumed that the SFBC MIMO scheme is applied to the A/C carrier 500/540.

The first base station 200 transmits SFBC MIMO data 200-1 for each antenna to first and second terminals 100 and 120 through two different antennas 201 and 202. Data for each antenna, which is transmitted from the first base station 200 through the carrier A/C 500/540, is denoted by the reference numeral 200-1. Likewise, the second base station 220 transmits data 220-1 for each antenna to first and second terminals 100 and 120 through two different antennas 221 and 222. Data for each antenna, which is transmitted from the second base station 220 through the carrier A/C, is denoted by the reference numeral 220-1.

The first terminal 100 receives the SFBC MIMO data 200-1 that has been transmitted from the first base station 200 through the carrier A/C using the first and second antennas 101 and 102. Also, the second terminal 120 receives the SFBC MIMO data 200-1 that has been transmitted from the first base station 200 through the carrier A/C using the first and second antennas 121 and 122, and simultaneously receives SFBC MIMO data 220-1 transmitted from the second base station 220, thereby obtaining macro diversity gain.

In FIG. 7, base stations apply a SM MIMO scheme to the carrier B/D, and transmit additional data for providing a high quality service, to terminals, through the carrier BID, using two antennas. The first base station 200 transmits SM data 200-2 for each antenna to the first and second terminals 100 and 120, using different antennas 201 and 202. Data for each antenna, which is transmitted from the first base station 200 through the carrier B/D 520/560, is denoted by the reference numeral 200-1.

Likewise, the second base station 220 transmits SM data 220-2 for each antenna to the first and second terminals 100 and 120, using different antennas 221 and 222. Data for each antenna, which is transmitted from the second base station 200 through the carrier B/D 520/560, is denoted by the reference numeral 220-1.

The first terminal 100 belonging to a first cell 300 receives the SM data 200-2 transmitted from the first base station 200, using the antennas 101 and 102 installed in the first terminal 100, through the carrier B/D 520/540.

Also, the first terminal 100 having a good channel condition receives both the SFBC MIMO data 200-1 and the SM MIMO data 200-2 through two carriers. The second terminal 120 receives the SFBC MIMO data 200-1 and 220-1 through the two antennas installed in the second terminal 120, thereby obtaining macro diversity gain.

Figure 8:
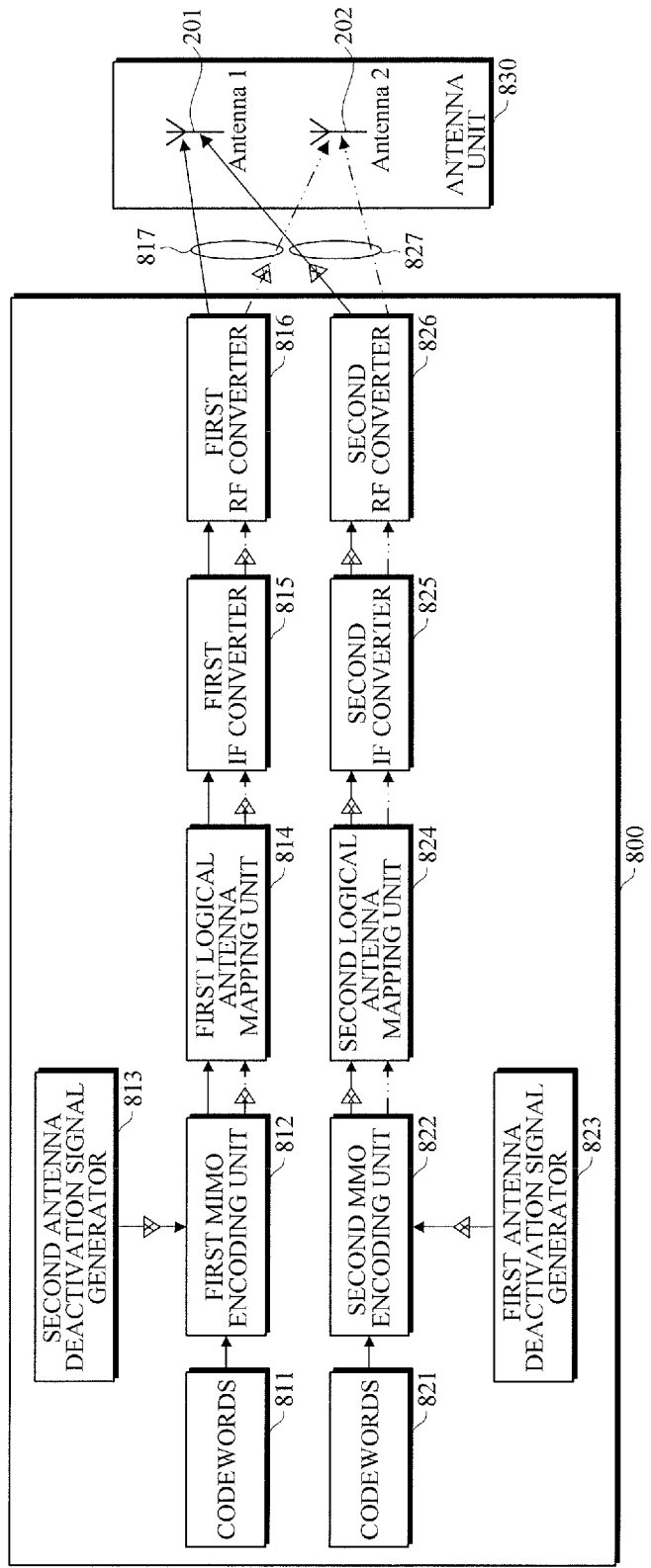
FIG. 8 is a diagram illustrating another example of a multi-carrier transmitting apparatus for providing a multicast service in a MIMO system.

FIG. 8 is a diagram illustrating another example of a multi-carrier transmitting apparatus for providing a multicast service in a MIMO system.

In the example of FIG. 8, data that is to be transmitted is assumed to be data subject to channel coding and modulation. Codewords 811 and 821 that are to be transmitted may be a bundle of data. The codewords 811 and 821 are MIMO-encoded by the first and second MIMO encoding units 812 and 822.

MIMO encoding means multiplying data by weighting vectors according to the MIMO scheme. The first and second MIMO encoding units 812 and 822 may receive deactivation signals from first and second antenna deactivation signal generators 823 and 813, respectively, in order to prevent signals from being transmitted through the corresponding antenna.

Then, first and second logical antenna mapping units 814 and 824 collect data that will be transmitted through the respective antennas. The collected data that will be transmitted through the respective antennas are converted into IF signals by first and second IF converters 815 and 825, and transferred to first and second RF converters 816 and 826. Then, the first and second RF converters 816 and 826 converts the IF signals into RF signals corresponding to transmission frequency bands, and transfers the RF signals to the antennas 201 and 202, so that the antennas 201 and 202 transmit the resultant signals through the corresponding multi-carriers.

In FIG. 8, the first and second antenna deactivation signal generators 823 and 813 generates deactivation signals for deactivating the first and second antennas 201 and 202, respectively. Each deactivation signal may be information for turning on/off the corresponding antenna. Accordingly, if one of the MIMO encoding units 812 and 822 receives a deactivation signal for a specific antenna, the MIMO encoding unit 812 or 822 outputs no data related to the corresponding antenna. In the example of FIG. 8, the case where no data is transmitted is denoted by a mark "x".

At this time, signals that are transmitted through each antenna may be transmitted through different carriers adjacent to each other or not adjacent to each other. Also, in the case of providing a multicast service, data that is transmitted through each antenna may be multicast service data, other service data, or unicast service data.

Also, the first IF converter 815 and the first RF converter 816 may be integrated into a first RF processing unit, and the second IF converters 825 and the second RF converter 826 may be integrated into a second RF processing unit, or all the IF and RF converters 815, 825, 816, and 826 may be integrated into a RF processing unit.

Figure 9:
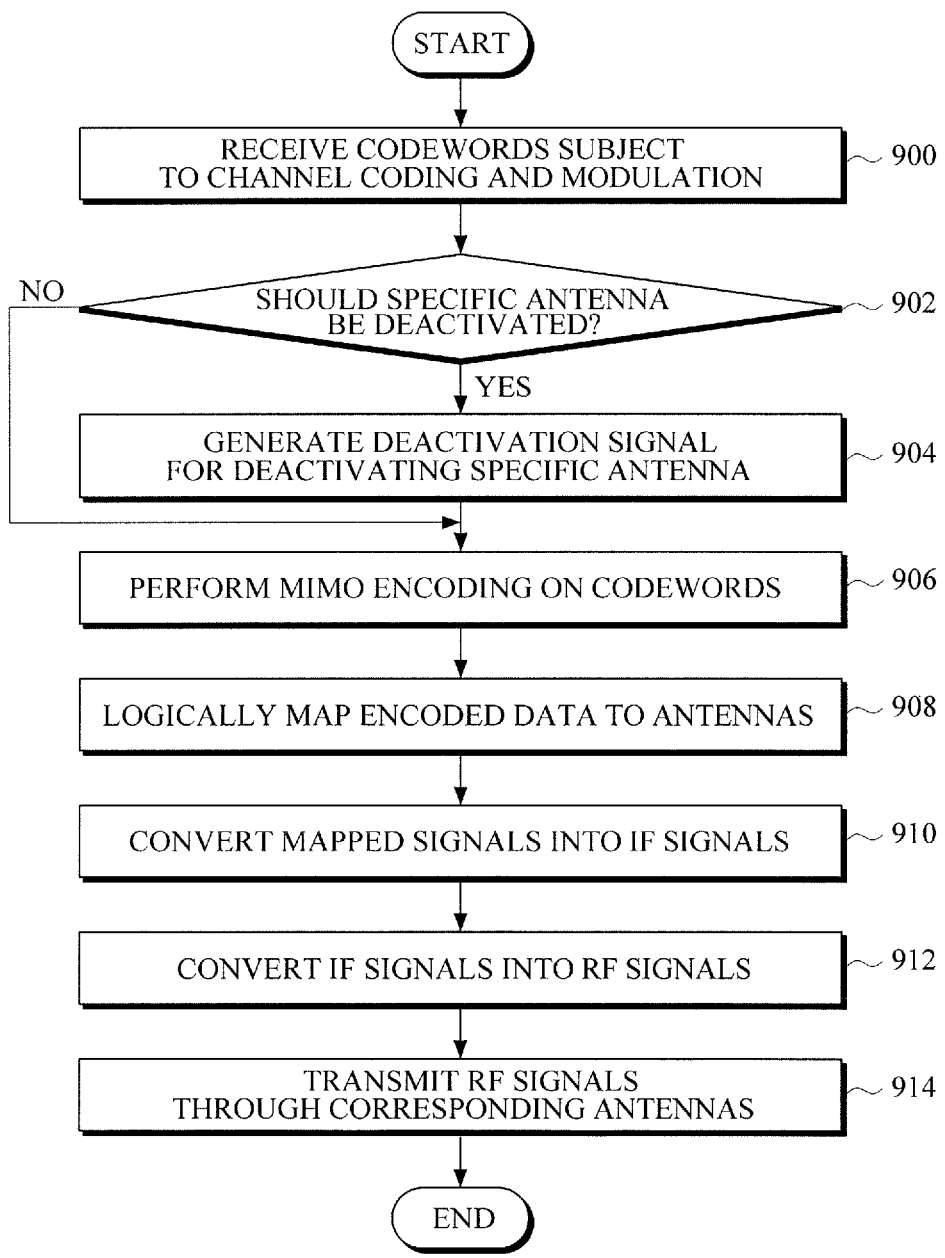
FIG. 9 is a flowchart illustrating another example of a multi-carrier transmitting method for providing a multicast service in a MIMO system Throughout the drawings and the detailed description, unless otherwise described, the same drawing reference numerals will be understood to refer to the same elements, features, and structures. The relative size and depiction of these elements may be exaggerated for clarity, illustration, and convenience.

FIG. 9 is a flowchart illustrating another example of a multi-carrier transmitting method for providing a multicast service in a MIMO system In operation 900, a transmitting apparatus receives data subject to channel coding and modulation from the upper layer. The data is codewords (811 and 821 of FIG. 8) that will be transmitted.

Then, in operation 902, the transmitting apparatus determines whether a specific antenna has to be deactivated in order to prevent signals from being transmitted through the specific antenna. In the case where a specific antenna is deactivated, the multicast service is provided through an antenna.

If a specific antenna has to be deactivated, the process proceeds to operation 804, and the transmitting apparatus controls the first and second antenna deactivation signal generators (823 and 813 of FIG. 8) to generate a deactivation signal for the corresponding antenna. However, if no deactivation of antennas is needed, the process proceeds to operation 906.

In operation 906, the transmitting apparatus performs MIMO encoding on the codewords 811 and 812 that will be transmitted. If a specific antenna has to be deactivated, MIMO encoding is performed in such a way to prevent data that will be transmitted to the corresponding antenna from being output. Also, MIMO encoding means multiplying data with weighing vectors according to the MIMO scheme.

Then, in operation 908, the transmitting apparatus receives the signal subject to MIMO encoding, and maps data that will be transmitted through the respective antennas to logical antennas. Then, in operation 910, the transmitting apparatus converts data that will be transmitted through the respective antennas into IF signals, and in operation 912, the transmitting apparatus converts the IF signals into RF signals. In operation 914, the resultant signals are transmitted over the corresponding regions through the antennas 201 and 202. If a specific antenna has been deactivated, no signal is transmitted to the corresponding antenna.

At this time, signals that are transmitted through each antenna may be transmitted through different carriers adjacent to each other or not adjacent to each other. Also, in the case of providing a multicast service, data that is transmitted through each antenna may be multicast service data, other service data, or unicast service data.

Therefore, according to the examples described above, it is possible to provide a high-quality multicast service to terminals that use the multicast service, according to their channel conditions, without overlappingly allocating radio resources to the terminals.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multi-carrier transmitting apparatus for providing a multicast service in a base station using a multi-input and multi-output (MIMO) scheme, comprising:
    a mapping unit configured to map first data, to first and second service, and second data different from the first data, to first and second antennas, respectively; a Radio Frequency (RF) processor configured to convert the first data mapped to the first antenna into a first transmission-band RF signal of a carrier corresponding to the first data, and the second data mapped to the second antennas into a second transmission-band RF signal of a carrier corresponding to the second data, respectively; and
    an antenna mapping unit, configured to transmit the first transmission-band RF signal through the first antenna, and the second transmission-band RF signal through the second antenna, respectively,
    wherein the second data is a unicast signal.

2. A multi-carrier transmitting apparatus for providing a multicast service of a base station using a multi-input and multi-output (MIMO) scheme, comprising:
    a MIMO encoding unit configured to multiply first data for providing the multicast service, and second data different from the first data by first and second weights according to a MIMO scheme, respectively, thereby encoding the first data and the second data to first encoded data and second encoded data, respectively;
    a mapping unit configured to logically map the first encoded data and the second encoded data to first and second antennas that are to transmit the first encoded data and the second encoded data, respectively, thereby generating a first mapped signal and a second mapped signal;
    an Radio Frequency (RF) processing unit configured to convert the first mapped signal into a first transmission-band RF signal of a carrier corresponding to the first mapped signal, and the second mapped signal into a second transmission-band RF signal of a carrier corresponding to the second mapped signal, respectively; and
    an antenna unit configured to transmit the first transmission-band RF signal through the first antenna and the second transmission-band RF signal through the second antenna,
    wherein the first data is transmitted to all terminals being provided the multicast service by the base station, and
    the second data provides an additional radio resource and is transmitted only to designated terminals.

3. The multi-carrier transmitting apparatus of claim 2, wherein the RF processor comprises:
    first and second Intermediate Frequency (IF) converters configured to convert the first data and the second data into a first IF signal and a second IF signal, respectively;
    first RF converter configured to convert the first IF signal into a first RF signal having a carrier frequency among two carrier frequencies adjacent to each other, and to decide a power intensity of the first RF signal so that the first RF signal is transmitted over the entire coverage region of the base station; and
    a second RF converter configured to convert the second IF signal into a second RF signal having the other carrier frequency among the carrier frequencies adjacent to each other, and to decide a power intensity of the second RF signal so that the second RF signal is transmitted over a predetermined region around the base station, wherein the power intensity of the second RF signal is set to be lower than a predetermined threshold intensity.

4. The multi-carrier transmitting apparatus of claim 2, wherein the RF processing unit comprises:
    first and second Intermediate Frequency (IF) converter configured to convert the first data and the second data into a first IF signal and a second IF signal, respectively;
    a first RF converter configured to convert the first IF signal into a first RF signal having a lower carrier frequency among two carrier frequencies not adjacent to each other; and
    a second RF converter configured to convert the second IF signal into a second RF signal having a higher carrier frequency among the carrier frequencies not adjacent to each other.

5. The multi-carrier transmitting apparatus of claim 2, wherein the second data is additional data of the first data.

6. A multi-carrier transmitting apparatus for providing a multicast service of a base station using a multi-input and multi-output (MIMO) scheme, comprising:
   a MIMO encoding unit configured to multiply first data for providing the multicast service, and second data different from the first data by first and second weights according to a MIMO scheme, respectively, thereby encoding the first data and the second data to first encoded data and second encoded data, respectively;
   a mapping unit configured to logically map the first encoded data and the second encoded data to first and second antennas that are to transmit the first encoded data and the second encoded data, respectively, thereby generating a first mapped signal and a second mapped signal;
   an Radio Frequency (RF) processing unit configured to convert the first mapped signal into a first transmission-band RF signal of a carrier corresponding to the first mapped signal, and the second mapped signal into a second transmission-band RF signal of a carrier corresponding to second mapped signal, respectively; and
   an antenna unit configured to transmit the first transmission-band RF signal through the first antenna and the second transmission-band RF signal through the second antenna,
   wherein the second data is a unicast signal.

7. A method for transmitting multi-carriers to provide a multicast service in a base station using a multi-input and multi-output (MIMO) scheme, comprising:
   mapping first data for providing the multicast service, and second data different from the first data, to first and second antennas, respectively; converting the first data and the second data into a first Intermediate Frequency (IF) signal and a second IF signal, respectively;
   converting the first IF signal into a first RF signal having a lower carrier frequency among two carrier frequencies not adjacent to each other; and converting the second IF signal into a second RF signal having a higher carrier frequency among the carrier frequencies not adjacent to each other,
   wherein the first RF signal is transmitted to all terminals being provided the multicast service by the base station, and
   the second RF signal provides an additional radio resource and is transmitted only to designated terminals.

8. The method of claim 7, wherein the second data is a unicast signal or additional data of the first data.

9. A method for transmitting multi-carriers to provide a multicast service In a base station using a multi-input and multi-output (MIMO) scheme, comprising:
   multiplying first data for providing the multicast service, and second data different from the first data by first and second weights according to the MIMO scheme, respectively, thereby encoding the first data and the second data to first encoded data and second encoded data, respectively;
   logically mapping the first encoded data and the second encoded data to first and second antennas that are to transmit the first encoded data and the second encoded data, respectively, thereby generating a first mapped signal and a second mapped signal;
   converting the first mapped signal into a first transmission-band RF signal of a carrier corresponding to the first mapped signal, and the second mapped signal into a second transmission-band RF signal of a carrier corresponding to the second mapped signal, respectively; and
   transmitting the first transmission-band RF signal through the first antenna and the second transmission-band RF signal through the second antenna,
   wherein the first data is transmitted to all terminals being provided the multicast service by the base station, and
   the second data provides an additional radio resource and is transmitted only to designated terminals.

10. A multi-carrier transmitting apparatus for providing a multicast service in a base station using a multi-input and multi-output (MIMO) scheme, comprising;
   a mapping unit configured to map first data for providing the multicast service, and second data different from the first data, to first and second antennas, respectively;
   a Radio Frequency (RF) processor configured to convert the first data mapped to the first antenna into a first transmission-band RF signal of a carrier corresponding to the first data, and the second data mapped to the second antennas into a second transmission-band RF signal of a carrier corresponding to the second data, respectively; and
   an antenna mapping unit configured to transmit the first transmission-band RF signal through the first antenna, and the second transmission-band RF signal through the second antenna, respectively,
   wherein the first transmission-band RF signal is transmitted to all terminals being provided the multicast service by the base station, and
   the second transmission-band RF signal provides an additional radio resource and is transmitted only to designated terminals.

11. The multi-carrier transmitting apparatus of claim 10, wherein the RF processor comprises:
   first and second Intermediate Frequency (IF) converters configured to convert the first data and the second data into a first IF signal and a second IF signal, respectively;
   a first RF converter configured to convert the first IF signal into a first RF signal having a carrier frequency among two carrier frequencies adjacent to each other, and to decide a power intensity of the first RF signal so that the first RF signal is transmitted over the entire coverage region of the base station; and
   a second RF converter configured to convert the second IF signal into a second RF signal having the other carrier frequency among the carrier frequencies adjacent to each other, and to decide a power intensity of the second RF signal so that the second RF signal is transmitted over a predetermined region around the base station, wherein the power intensity of the second RF signal is set to be lower than a predetermined threshold intensity.

12. The multi-carrier transmitting apparatus of claim 10, wherein the RF processor comprises:
   first and second Intermediate Frequency (IF) converter configured to convert the first data and the second data into a first IF signal and a second IF signal, respectively;
   a first RF converter configured to convert the first IF signal into a first RF signal having a lower carrier frequency among two carrier frequencies not adjacent to each other; and
   a second RF converter configured to convert the second IF signal into a second RF signal having a higher carrier frequency among the carrier frequencies not adjacent to each other.

13. The multi-carrier transmitting apparatus of claim 10, wherein the second data is additional data of the first data.

14. The multi-carrier transmitting apparatus of claim 10, wherein the carrier corresponding to the second data provides the additional radio resource to terminals having a high signal to noise ratio.

15. The multi-carrier transmitting apparatus of claim 10, wherein the carrier corresponding to the first data is transmitted to all terminals being provided the multicast service located in the service region of the base state, and the carrier corresponding to the second data provides an additional radio resource and is transmitted only to terminals being provided the multicast service that reside in a predetermined region around the base station, the predetermined region being smaller than the service region of the base region.

16. A multi-carrier transmitting apparatus for providing a multicast service of a base station using a multi-input and multi-output (MIMO) scheme, comprising:

a MIMO encoding unit configured to multiply first data for providing the multicast service, and second data different from the first data by first and second weights according to a MIMO scheme, respectively, thereby encoding the first data and the second data to first encoded data and second encoded data, respectively;

a mapping unit configured to logically map the first encoded data and the second encoded data to first and second antennas that are to transmit the first encoded data and the second encoded data, respectively, thereby generating a first mapped signal and a second mapped signal;

an Radio Frequency (RF) processing unit configured to convert the first mapped signal into a first transmission-band RF signal of a carrier corresponding to the first mapped signal, and the second mapped signal into a second transmission-band RF signal of a carrier corresponding, to the second mapped signal, respectively; and an antenna unit configured to transmit the first transmission-band RF signal through the first antenna and the second transmission-band RF signal through the second antenna, wherein the MIMO encoding unit receives a deactivation signal for deactivating the first or second antenna in order to prevent signals from being transmitted through a corresponding one of the first and second antennas.

17. A method for transmitting multi-carriers to provide a multicast service in a base station using a multi-input and multi-output (MIMO) scheme, comprising:

mapping first data for providing the multicast service, and second data different from the first data, to different antennas, respectively, thereby generating first mapped data and second mapped data;

converting the first mapped data into a first Intermediate Frequency (IF) signal and the second mapped data into a second IF signal, respectively;

converting the first IF signal into a first RF signal having a first carrier frequency among two carrier frequencies that are adjacent to each other and that are allocated to the multicast service, and deciding a power intensity of the first RF signal so that the first RF signal is transmitted by the first antenna over the entire coverage region of the base station; and converting the second IF signal into a second RF signal having a second carrier frequency among the two carrier frequencies that are adjacent to each other and that are allocated to the multicast service, and deciding a power intensity of the second RF signal so that the second RF signal is transmitted by the second antenna over a predetermined region around the base station that is smaller than the entire coverage region, wherein the first RF signal is transmitted to all terminals being provided the multicast service that are located in the coverage region of the base state, and the second RF signal provides an additional radio resource and is transmitted only to terminals being provided the multicast service that reside in the predetermined region around the base station.

18. The method of claim 17, wherein the second data is a unicast signal or additional data of the first data.

* * * * *